June 24, 1930.    T. F. LYLE    1,765,926
PLUMBING CLEANOUT SYSTEM
Filed June 25, 1929
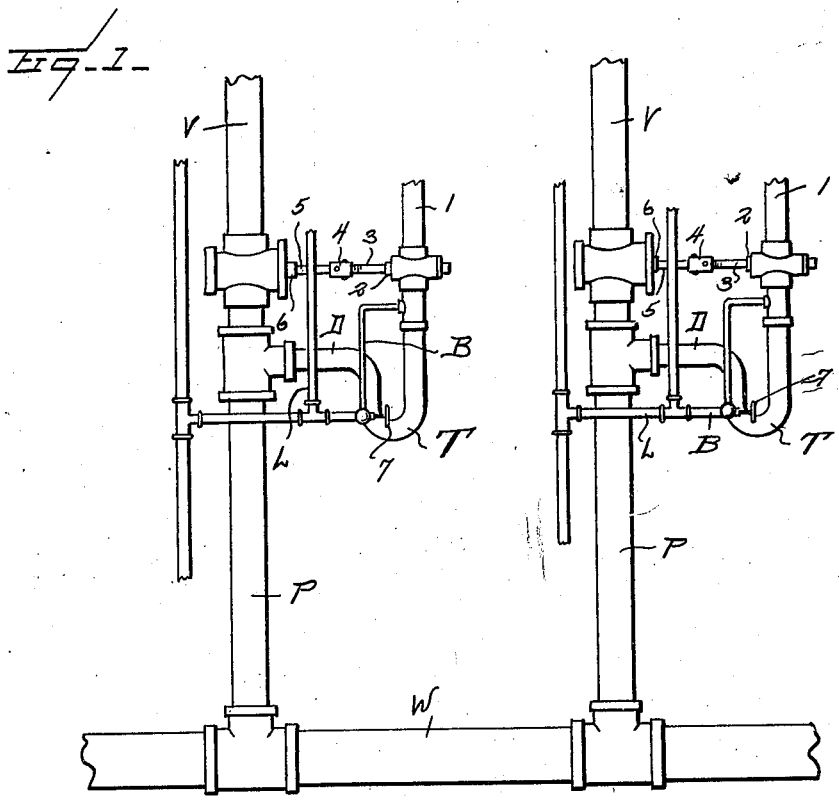
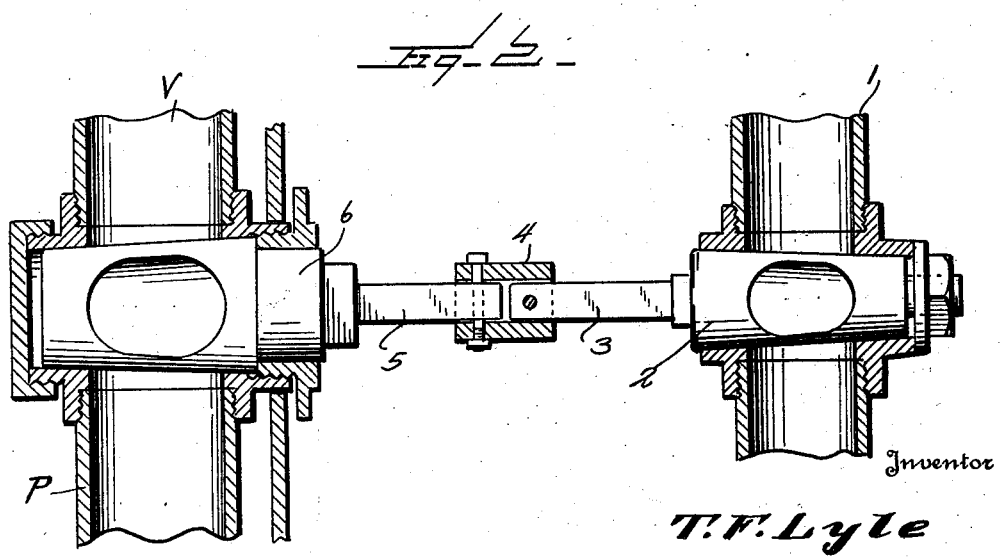

Patented June 24, 1930

1,765,926

UNITED STATES PATENT OFFICE

THURMAN F. LYLE, OF BRIDGEPORT, OHIO

PLUMBING CLEAN-OUT SYSTEM

Application filed June 25, 1929. Serial No. 373,661.

This invention relates to a plumbing cleanout system and it is an object of the invention to provide means whereby water and other fluid under pressure can be readily employed to provide a clean, sure and fast means to open clogged waste pipes, drain pipes and the like.

Another object of the invention is to provide a system of this kind embodying means to close and drain vent pipes on any plumbing fixture in a manner to prevent the waste water from one fixture backing up in a vent pipe or into another fixture.

An additional object of the invention is to provide a system of this kind which will fully comply with the various plumbing codes, laws and ordinances and which assures a sanitary opening of waste pipes which can be effected in freezing weather and in a way to prevent sewer gas from escaping within a building.

The invention consists in the details of construction and in the combination and arragement of the several parts of my improved plumbing cleanout system whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view illustrating a built-in plumbing fixture embodying my improved system:

Figure 2 is an enlarged fragmentary view partly in section and partly in elevation illustrating in detail the unitary valves as comprised in Figure 1;

In the embodiment of the invention as illustrated in Figures 1 and 2, W denotes the main waste pipe having in communication therewith a plurality of upstanding waste pipes P each of said pipes being continued upwardly by a vent pipe V.

In communication with each of the pipes P is a drain pipe D having interposed therein a conventional trap T, the tail 1 of which being upwardly disposed and adapted for communication with a desired plumbing fixture, such as a sink, basin and the like.

Interposed in the tail 1 of the trap T is a rotating valve member 2 whereby the communication of the tail 1 with the fixture may be opened and closed as desired.

This valve member 2 has extending outwardly from an end thereof an operating stem 3 having, in the present instance, universal coupling, as at 4, with the valve stem 5 extending outwardly from a second rotating valve member 6. This rotating valve member 6 is interposed in a vent pipe V and above the communication between the vertical waste pipe P and the drain pipe D.

The supply line L for the plumbing fixture associated with each of the tails 1 leads from a suitable source of supply of water or other fluid under pressure, and leading from said line L is a branch line B in communication with the tail 1 at a point below and in relatively close proximity to the valve 2. The branch line B has interposed therein a controlling valve 7.

If the plumbing system should become clogged or obstructed, as for example the drain D or pipe P at the left of Figure 1, the valves 2 and 6 are adjusted into closed position as well as the similar valves associated with the other fixtures. The valve 7 at the left of Figure 1 is then adjusted into open position and the resultant pressure of the fluid in a very small period of time will remove the obstruction or stoppage, thus restoring the plumbing system to its normal open condition.

By closing the various valves 2 and 6 back flow of the water or other fluid under pressure out through the tail piece 1 in any of the various hookups is prevented and at the same time escape of sewer gas into the building is prevented.

In modern plumbing systems the pipe P is concealed while the trap T and tail piece 1 and its associated parts are exposed. By having each set of valves 2 and 6 connected for unitary rotation a desired cleanout operation can be accomplished without the necessity of tearing down a wall or other structure to obtain access to a pipe P.

Any suitable means may be employed for adjusting the valves 2 and 6 into open or closed position and, as is clearly illustrated in Figure 2, it is to be noted that the valves 2 and 6 are so arranged that when one is in closed position the other has been similarly adjusted and vice versa.

By use of the universal coupling or connection 4 compensation is afforded in the event the valves 2 and 6 when in applied or working position should be out of alignment.

From the foregoing description it is thought to be obvious that a plumbing cleanout system constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In a plumbing system having vent and drain pipes positioned in spaced relation to each other and trap means, a valve interposed in the drain pipe intermediate the trap and the inlet, a second valve mounted in said vent pipe, coplanar with said first valve and in spaced relation thereto, connecting means for connecting said first and second valves whereby to effect simultaneous operation of the valves, and flushing means connected to said drain pipe and interposed therein intermediate said first valve and said trap, said connecting means comprising a tubular member and means for securing said tubular member to said valves.

In testimony whereof I hereunto affix my signature.

THURMAN F. LYLE.